(12) United States Patent
Quasters (10) Patent No.: US 9,725,293 B2
(45) Date of Patent: Aug. 8, 2017

(54) SYSTEM AND METHOD FOR DISTRIBUTION AND DISPENSING OF BEVERAGES

(75) Inventor: Mikael Quasters, Vinninga (SE)

(73) Assignee: PETAINER LIDKOPING AB, Malmo (SE)

( * ) Notice: Subject to any disclaimer, the term of this patent is extended or adjusted under 35 U.S.C. 154(b) by 1627 days.

(21) Appl. No.: 12/085,689

(22) PCT Filed: Nov. 29, 2006

(86) PCT No.: PCT/SE2006/001355
§ 371 (c)(1),
(2), (4) Date: Jan. 12, 2009

(87) PCT Pub. No.: WO2007/064277
PCT Pub. Date: Jun. 7, 2007

(65) Prior Publication Data
US 2009/0194561 A1    Aug. 6, 2009

Related U.S. Application Data

(60) Provisional application No. 60/740,282, filed on Nov. 29, 2005.

(30) Foreign Application Priority Data

Nov. 29, 2005 (SE) .................................. 0502604-2

(51) Int. Cl.
*B67D 1/04* (2006.01)
*B67D 1/08* (2006.01)
(Continued)

(52) U.S. Cl.
CPC ......... *B67D 1/0832* (2013.01); *B65D 1/0276* (2013.01); *B65D 1/0284* (2013.01);
(Continued)

(58) Field of Classification Search
CPC ............... B65D 1/12; B65D 1/14; B65D 1/16
(Continued)

(56) References Cited

U.S. PATENT DOCUMENTS 2,107,559 A    2/1938  Beck et al.
3,241,977 A    3/1966  Mitchell et al.
(Continued)

FOREIGN PATENT DOCUMENTS

CA    1222211 A     4/1983
CA    1 222 211     5/1987
(Continued)

OTHER PUBLICATIONS

Hamstead Brewing Centre Catalog, "5 gallon Budget barrel", 2 page of website.
(Continued)

*Primary Examiner* — Patrick M Buechner
(74) *Attorney, Agent, or Firm* — Nixon & Vanderyhe P.C.

(57) ABSTRACT

A method for the distribution and dispensing of beverages utilizes a one-way system including a disposable and free-standing container. The container is blow-molded in one piece from a preform of plastics. The system also includes a tube to be inserted in the container and a closure cap. The container can be filled, distributed to an end user and connected to standard beverage dispensing structure. After use, the empty container is collapsed and discarded.

11 Claims, 6 Drawing Sheets

(51) Int. Cl.
| | |
|---|---|
| *B65D 1/02* | (2006.01) |
| *B65D 47/24* | (2006.01) |
| *B67C 3/30* | (2006.01) |
| B29C 49/06 | (2006.01) |
| B29K 67/00 | (2006.01) |
| B29K 77/00 | (2006.01) |
| B29L 31/00 | (2006.01) |
| B65D 81/26 | (2006.01) |
| B67C 3/22 | (2006.01) |

(52) U.S. Cl.
CPC ............. *B65D 47/247* (2013.01); *B67C 3/30* (2013.01); *B29C 49/06* (2013.01); *B29K 2023/06* (2013.01); *B29K 2067/00* (2013.01); *B29K 2067/046* (2013.01); *B29K 2077/00* (2013.01); *B29K 2623/06* (2013.01); *B29L 2031/7158* (2013.01); *B65D 81/266* (2013.01); *B67C 2003/227* (2013.01); *B67D 2001/0812* (2013.01); *B67D 2001/0824* (2013.01)

(58) Field of Classification Search
USPC ........... 222/400.7, 400.8, 399, 401; 220/608, 220/604, 609; 215/375, 373, 374, 376, 215/377, 378
See application file for complete search history.

(56) References Cited

U.S. PATENT DOCUMENTS

| | | | |
|---|---|---|---|
| 3,586,514 A | 6/1971 | Vijlbrief | |
| 3,688,950 A | 9/1972 | Parish | |
| 3,708,082 A * | 1/1973 | Platte | B65D 1/0223 215/385 |
| 3,768,706 A | 10/1973 | Hill | |
| 3,825,145 A * | 7/1974 | Reynolds | B29C 41/20 220/288 |
| 3,827,595 A * | 8/1974 | Reynolds | B29C 41/20 220/288 |
| 3,984,516 A * | 10/1976 | Carrow | B29C 51/002 264/230 |
| 4,265,374 A | 5/1981 | Sebalos | |
| 4,363,336 A * | 12/1982 | Cerrato | 137/212 |
| 4,380,306 A | 4/1983 | Knopf | |
| 4,491,247 A | 1/1985 | Nitchman et al. | |
| 4,506,815 A * | 3/1985 | Melas et al. | 222/630 |
| 4,520,654 A * | 6/1985 | Terhune | 73/24.01 |
| 4,520,954 A * | 6/1985 | Brown | 222/400.8 |
| 4,531,656 A | 7/1985 | Nitchman et al. | |
| 4,588,000 A | 5/1986 | Malin et al. | |
| 4,657,502 A * | 4/1987 | Rydmann | B29C 49/08 264/531 |
| 4,665,940 A | 5/1987 | Jacobson | |
| 4,678,101 A | 7/1987 | Nitchman et al. | |
| 4,780,257 A | 10/1988 | Beck | |
| 4,865,088 A | 9/1989 | Stearns | |
| 4,909,289 A * | 3/1990 | Hagan | B67D 1/0832 137/312 |
| 5,022,565 A | 6/1991 | Sturman et al. | |
| 5,034,252 A * | 7/1991 | Nilsson et al. | 428/35.8 |
| 5,040,703 A | 8/1991 | Roark et al. | |
| 5,102,010 A * | 4/1992 | Osgar | B65D 47/36 222/1 |
| 5,217,128 A | 6/1993 | Stenger | |
| 5,240,144 A * | 8/1993 | Feldman | B67D 1/0001 222/105 |
| 5,285,954 A * | 2/1994 | Goglio | B65D 21/0231 206/524.8 |
| 5,310,068 A * | 5/1994 | Saghri | B65D 1/0292 215/12.1 |
| 5,353,954 A | 10/1994 | Steward et al. | |
| 5,385,025 A | 1/1995 | Kellett | |
| 5,603,423 A * | 2/1997 | Lynn | B65D 1/0284 215/375 |
| 5,626,228 A * | 5/1997 | Wiemann et al. | 206/511 |
| 5,913,438 A | 6/1999 | Beck et al. | |
| 6,112,924 A | 9/2000 | Zhang | |
| 6,182,863 B1 | 2/2001 | Van Der Meer et al. | |
| 6,253,808 B1 | 7/2001 | Amberg et al. | |
| 6,363,729 B1 | 4/2002 | Brahmbhatt et al. | |
| 6,375,048 B1 | 4/2002 | Van Der Meer et al. | |
| 6,524,672 B1 * | 2/2003 | Slat et al. | 428/35.7 |
| 6,666,358 B1 * | 12/2003 | Field | 222/400.7 |
| 6,745,922 B1 * | 6/2004 | Vlooswijk et al. | 222/399 |
| 6,752,284 B1 * | 6/2004 | Akiyama | B65D 1/0223 215/373 |
| 6,841,262 B1 | 1/2005 | Beck et al. | |
| 7,051,892 B1 * | 5/2006 | O'Day, Jr. | 215/383 |
| 7,422,780 B2 * | 9/2008 | Suzuki | 428/35.7 |
| 2002/0015770 A1 * | 2/2002 | Moretti | A23L 2/44 426/324 |
| 2002/0017525 A1 * | 2/2002 | Searle et al. | 220/366.1 |
| 2002/0179461 A1 | 12/2002 | Mollstam et al. | |
| 2004/0074904 A1 * | 4/2004 | Share et al. | 220/62.22 |
| 2004/0209022 A1 | 10/2004 | Ghatta et al. | |
| 2005/0028487 A1 | 2/2005 | Winters et al. | |
| 2008/0245804 A1 * | 10/2008 | Weinberger | B65D 1/0292 220/608 |

FOREIGN PATENT DOCUMENTS

| | | | |
|---|---|---|---|
| DE | 101 38 365 | 2/2003 | |
| EP | 0 299 767 A1 | 1/1989 | |
| EP | 0299 767 B | 1/1989 | |
| EP | 0 420 561 | 4/1991 | |
| EP | 0 427 751 | 3/1994 | |
| EP | 0 429 476 | 4/1994 | |
| EP | 0 527 903 | 12/1994 | |
| EP | 0 527 902 | 8/1996 | |
| EP | 1 468 930 A1 | 10/2004 | |
| EP | 1468930 A | 10/2004 | |
| FR | 2 688 469 | 9/1993 | |
| FR | EP 1527999 A1 * | 5/2005 | ........... B65D 1/0223 |
| GB | 1 455 652 | 11/1976 | |
| GB | 2 091 228 | 7/1982 | |
| JP | 55-163137 A | 12/1980 | |
| JP | 2-282096 A | 11/1990 | |
| JP | U 6-80698 A | 11/1994 | |
| JP | 10-194391 A | 7/1998 | |
| JP | 11-278404 A | 10/1999 | |
| JP | 2001-62975 A | 3/2001 | |
| JP | 2005-305676 A | 11/2005 | |
| WO | WO 89/00544 | 1/1989 | |
| WO | WO 99/02451 | 1/1999 | |
| WO | 99/11563 | 3/1999 | |
| WO | 99/44901 | 9/1999 | |
| WO | WO 00/35803 | 6/2000 | |
| WO | 00/64803 | 11/2000 | |
| WO | 00/78665 | 12/2000 | |
| WO | WO 01/12510 | 2/2001 | |
| WO | 03/008293 | 1/2003 | |
| WO | 2004/099060 | 11/2004 | |

OTHER PUBLICATIONS

Northern Brewer, "Draft Beer EQU", 4 pages of website.
International Search Report for PCT/SE2006/001355, mailed Feb. 1, 2007.
Feb. 18, 2016 Official Action issued in Russian Application No. 2012108419 (with English translation).
Aug. 10, 2016 Examination Report issued in Indian Application No. 3329/CHENP/2008.
Jan. 5, 2016 Office Action issued in Japanese Application No. 2012-271985 (with English translation).
Apr. 18, 2017 Notice of Rejection issued in Japanese Application No. 2012-271985 (with translation).

* cited by examiner

SYSTEM AND METHOD FOR DISTRIBUTION AND DISPENSING OF BEVERAGES

This application is the U.S. national phase of International Application No. PCT/SE2006/001355, filed 29 Nov. 2006, which designated the U.S. and claims priority to Sweden Application No. 0502604-2, filed 29 Nov. 2005, and claims the benefit of U.S. Provisional Application No. 60/740,282, filed 29 Nov. 2005, the entire contents of each of which are hereby incorporated by reference.

TECHNICAL FIELD

The present inventive concept concerns a system and a method for distribution and dispensing of beverages.

BACKGROUND ART

When supplying relatively large amounts of beverage, in the order of tens of liters, to an establishment it is known to use refillable steel containers, in the case of beer and such, or heavy duty refillable or recyclable plastic containers, in the case of water for water dispensers. The steel containers or kegs are costly to produce and to keep in stock for a supplier of beverage, and after they have been emptied and prior to their return trip they demand a large storage volume for an end user. The steel kegs are rather heavy; a 20 liter keg weighs about 10 kg (empty).

WO 00/78665 discloses a beer container or keg comprising an inner hollow shell of blow moulded polyethylene terephtalate (PET), a rigid outer hollow shell of moulded high-density polyethylene enclosing and supporting the inner shell and a spear structure including a dispenser tube extending from a bottom interior region of the inner shell and through a dispensing outlet at the top of the outer shell. The above publication addresses the mentioned problem associated with steel containers but still only provides a partial solution since the container still is a relatively expensive and elaborate construction.

While the above known containers operate in a conventional way, by application of an internal pressure in order to force beer out of the container, an alternative solution is described in WO 99/11563. This known solution includes applying an outer pressure to a flexible container, said pressure being a mechanical pressure or a gas pressure. This known system also requires several accessories which makes it expensive and complicated.

WO 04/099060 describes a method for dispensing a beverage and devices therefor. The system is similar to the one previously mentioned by an external gas pressure being applied between the container and an outer housing, though the container is placed upside down in a tailor-made stand.

A further example of a plastic container for beer is described in WO 03/008293. However, this container is to be disposed in an outer casing, such as a box of metal or paperboard.

When non-carbonated or low-carbonated beverages have been filled in plastic containers, it has been necessary to use a container with relatively thick walls in order to ensure manageability and stability so that the container does not collapse when being handled and/or emptied. A known example is water containers adapted to be mounted upside down in a support, see for example U.S. Pat. No. 5,217,128. These containers have a wall thickness of about 0.8-1.0 mm in order to meet the demands of manageability and stability as mentioned above. During portion-by-portion dispensing from these containers, a sub-atmospheric pressure is generated inside the container, leading to surrounding air being drawn into the container. This has an injurious effect on the hygiene in the container and the quality of the water can consequently not be vouched for. Thick-walled containers result in increased production and transportation costs, relative to thin-walled containers. Further, the thick-walled containers demand larger resources in terms of disposal systems. This is especially a problem in developing countries where drinking water often needs to be transported in various kinds of containers to areas that do not have access to safe running water.

SUMMARY OF THE INVENTION

It is an object of the present invention to provide solutions to, or at least reductions of, the above and related problems.

According to the invention, this is achieved by the provision of a system for distribution and dispensing of beverages, comprising:

a container for beverage blow moulded from a preform of plastics, said container having a mouth portion, a shoulder portion, a base portion and a body portion extending between the shoulder portion and the base portion, said container being freestanding, formed in one piece and disposable; and a tube structure comprising an elongate tube to be inserted in the container and having an inner conduit for beverage, and a closure element to be connected to the mouth portion of the container, wherein—in use—an inner end of the tube is located adjacent to the base portion of the container for passing beverage from said inner end, through said conduit and to the closure element for dispensing.

The fact that the container is freestanding and disposable as well as formed in a single piece provides a cost-efficient container that can be produced from a preform at the location where the container is later supposed to be filled. After use the empty container can be efficiently discarded without taking up a significant amount of storage space. In one embodiment the container system replaces a conventional keg system for draught beer. Compared to regular steel containers that are utilised for draught beer, the inventive container is more cost-efficient in more than one aspect. First, it is less costly to produce in terms of raw material costs, power consumption and processing steps. Second, since the containers are blow moulded from preforms on demand at the location in which it subsequently will be filled, they do not require nearly as much storage space. Third, in the case of steel containers, there is a need for an organisation handling the returned containers, which obviously increases the costs further. Because of the fact that the container of the inventive system is freestanding and durable, there is no need for the provision of an outer, protecting and/or supporting structure. In use the container is simply placed standing upright without any support, and connected to a standard dispensing system. This is obviously more cost-efficient than known solutions, but it also requires less space than if an additional supporting structure needs to be used.

The disposable container is preferably made of a polymer material used for smaller size plastic bottles, for example polyesters, such as polyethylene terephtalate (PET); polyethylene naphtalate (PEN) and others; polyolefin; polyamide (nylon); polylactide or any combination of these. In the case that the container is made from polylactide, the container is biodegradable under the appropriate conditions. Further, a container made from polylactide can be produced at lower temperatures with the result that a wider range of scavengers can be used for protection of the contents of the container. Polyolefins have an inherent advantage in that they are potent steam barriers and that they are widely used within the field of containers. Polyethylene terephtalate is widely used within the field of plastic bottles in general and is in that aspect a suitable material to use. In order to protect the contents of the container from destructive radiation, such as sunlight, the container may be coloured.

The body portion of the container preferably has a sidewall thickness of about 0.2-0.6 mm, most preferably 0.35-0.40 mm. The thinner the wall thickness the lighter and less expensive the container. Thanks to the thin-walled structure, the empty container can easily be collapsed to a very small volume before it is discarded. In this context, the invention provides a freestanding container that is highly cost-efficient in terms of container volume capacity per weight of container base material. The sidewall thickness is generally measured approximately in the middle region of the body portion.

In one embodiment the freestanding container is supported on a number of legs which form part of the base portion. This is called a petaloid base. Since the container is likely to be subjected to an internal pressure exceeding atmospheric pressure—at least in use—possible flat surfaces of the container tend to bulge. Therefore the provision of legs extending from the base portion makes it possible for the container to stand firmly on a surface and still be formed in one piece.

The disposable and thin-walled container is preferably provided with a barrier against oxygen and carbon dioxide in order to prevent that these gases diffuse into and out of the container. To prolong the shelf life of the product contained in the container, the oxygen barrier is an important factor in order to prevent oxygen from diffusing into the container. Also, if the contents of the container are carbonated it is important for the contents to stay carbonated for the expected shelf life, which is facilitated by the provision of a carbon dioxide barrier. These barriers can be achieved with known multilayer techniques including a combination of polyester and polyamide with optional additional scavengers, and/or by doping the container material with metal ions, such as cobalt, iron, nickel, copper, manganese, etc, as described for instance in the applicant's patents EP-B-429, 476; EP-B-427,751; EP-B-527,902 and EP-B-527,903; and preferably by blend techniques. An example of a blend technique is when a container material such as PET is blended with another material, such as polyamide, carrying a scavenger. This technique generally does not provide as good barrier properties as the multilayer techniques, but is less costly.

The barrier can also be provided in the form of coatings, such as lacquers and/or silicon oxide. Lacquers are generally applied to the outer surface of the container and silicon oxide to the inner surface, the latter in a plasma coating process. If silicon oxide is used on the inside this inhibits the use of scavengers in the actual container, and in this case scavengers are added to the tube structure and/or the closure element. Even if the container is filled with great precaution, it is likely that a small amount of oxygen will be present, and scavengers added to the tube structure and/or closure element will take care of this. Because of their properties, scavengers are often referred to as being an "active" barrier as opposed to "passive" barriers such as a lacquer. Barriers are generally also provided to inhibit "diffusion" into or out of the container of steam, radiation, such as UV-radiation, and aroma. In order to protect the contents of the container from destructive radiation, such as sunlight, the container may be coloured.

The body portion of the one-piece container can be cylindrical with an essentially constant diameter. This is beneficial in terms of a more space-efficient packaging during transport compared to a container where a substantial part of the container bulges radially outwards. This cylindrical surface is also suitable for provision of outer labels, brands, trademarks etc, as well as for being provided with a relief during the blow moulding of the preform into a container.

The closure element of the container system preferably comprises a check valve biased in a closing direction. This makes it possible to apply the valve to the mouth portion of the container before filling the container and makes the use of an additional transportation lid redundant. Further a tamper and/or dust seal is simply applied covering the check valve.

The closure element can also be a pierceable cap formed in one piece. This variant is simple to produce and ensures a cost-efficient and secure seal. This type of pierceable cap is applied after filling of the container. Before use the cap is penetrated by piercing means, e.g. syringe-type needles, of a dispense head, providing for an opening for dispensing beverage in liquid communication with the tube, and an opening for injection of propellant gas, such as carbon dioxide or nitrogen.

If such a pierceable cap is used, the system is preferably provided with a dispense head having cap piercing means. In this way the dispense head can be attached to the container without the cap being removed. The cap piercing means comprise means for putting the dispense head in fluid communication with the tube extending down in the beverage, and means for providing a propellant gas to the container.

In a preferred embodiment the inventive system is intended to replace current draught beer kegs or barrels used commercially as well as domestically. The preferred size range is therefore large, with a preferred volume capacity of 3-40 liters, preferably 15-30 liters and more preferably 20-25 liters for commercial use. For domestic use the preferred range is 3-10 liters, and most preferably 4-6 liters.

The container of the inventive system is preferably blow moulded from a PET preform that has been subjected to a stretch ratio on the order of 10-20, preferably 12-16, and more preferably 14-16. As used in this context "stretch ratio" refers to the ratio between the thickness of the preform side wall which is basically constant, and the thickness of the container side wall, at its thinnest.

The invention also refers to a method for distribution and dispensing of beverages, comprising the steps of:
providing a preform of plastics;
blow moulding said preform into a container for beverage having a mouth portion, a shoulder portion, a base portion and a body portion extending between the shoulder portion and the base portion, said container being freestanding, formed in one piece and disposable;
filling said container with a beverage;
providing the container with a tube structure comprising an elongate tube to be inserted in the container and having an inner conduit for beverage, and a closure element to be connected to the mouth portion of the container, wherein—in use—an inner end of the tube is located adjacent to the base portion of the container and beverage is passed from said inner end, through said conduit and to the closure element for dispensing; and closing the filled container by means of the closure element which is connected to the mouth portion, said closure element acting as a closure cap, wherein said filled and capped container forms a unit for distribution.

This inventive method makes it possible for a producer of beverages to have in-house production and filling of containers, just purchasing the preforms and the tube/valve structure from an external supplier. The preforms do not require a massive storage space, and since the containers are blow moulded in the processing step preceding the filling step—after which they are loaded and delivered to a customer—the total storage space needed is substantially reduced as compared to the standard keg system. Further, the producer of beverages can deliver the filled and capped container to customers at a low cost, again compared to the conventional keg system, and a threshold to expand into new markets is significantly reduced due to the reduction of associated costs. The tube/spear structure is generally assembled prior to being attached to the container. Depending on the type of closure element, this can be performed before or after filling of the container, which will be described later on. Hence, the step of filling the container and the step of providing the container with a tube structure can occur in reversed order.

The inventive method can also comprise the step of sealing the mouth portion of the container with a tamper and/or dust seal applied to the closure element following the step of adding the tube structure. For obvious reasons this step can be of importance to an end consumer.

The invention also relates to a container for use in the inventive system and the inventive method, said container for beverage being blow moulded from a preform of plastics and having a mouth portion, a shoulder portion, a base portion and a body portion extending between the shoulder portion and the base portion, said container being freestanding, formed in one piece and disposable. This gives the advantages previously described. The container is in particular suitable for draught beer and low-carbonated beverages, such as cider and soft drinks, but could also be used for non-carbonated beverages, such as wine, still drinks, milk, water and fruit juices.

Though generally being larger, the container is preferably made from a thermoplastic polymer material used for smaller size plastic bottles, for example polyesters, such as polyethylene terephtalate (PET) polyethylene naphtalate (PEN) and others; polyolefin; polyamide (nylon); polylactide (NatureWorks® PLA polymer) or any combination of these.

Preferred embodiments of the freestanding, single-piece and disposable container of the invention are set forth in the appended subclaims 19-31.

BRIEF DESCRIPTION OF THE DRAWINGS

In the following the present inventive concept will be described in more detail with reference to the accompanying drawings which illustrate preferred but non-limiting embodiments and in which.

DESCRIPTION OF PREFERRED EMBODIMENTS

Figure 1:
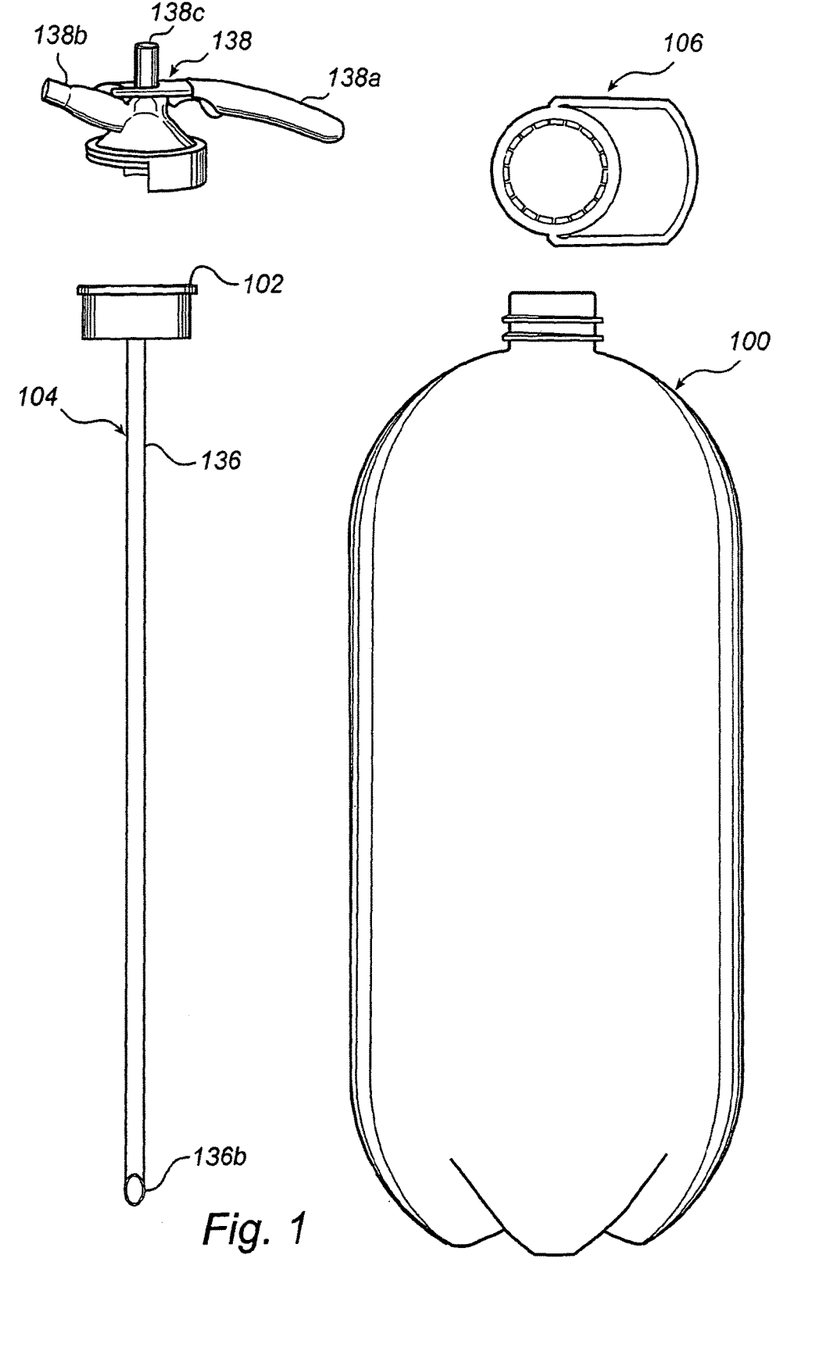
FIGS. 1 and 2 are schematics of a first embodiment of a system according to the invention, in a disassembled and an assembled state, respectively, with some accessories included.

FIG. 1 is a schematic illustration of a system according to a preferred embodiment of the invention. The system comprises a freestanding and disposable container 100 for beverage, a tube or spear structure 104 comprising a closure or valve element 102 and a tube 136. A handle 106 can optionally be attached to the upper portion of the container 100 for transportation purposes.

Figure 3:
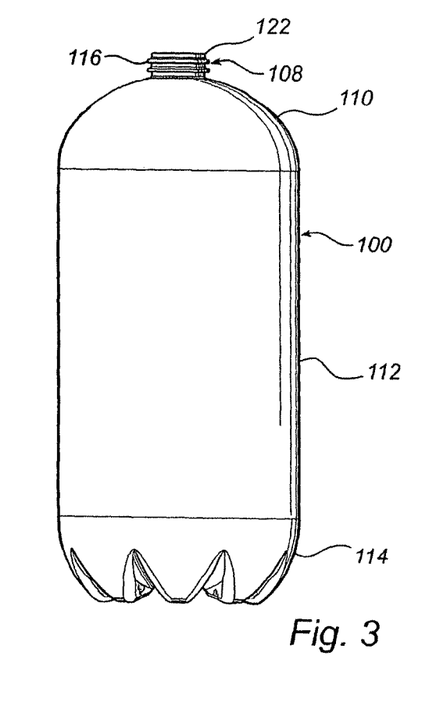
FIG. 3 is a schematic of a container produced from a preform shown in FIG. 4 and forming part of the system illustrated in FIG. 1.
Figure 5:
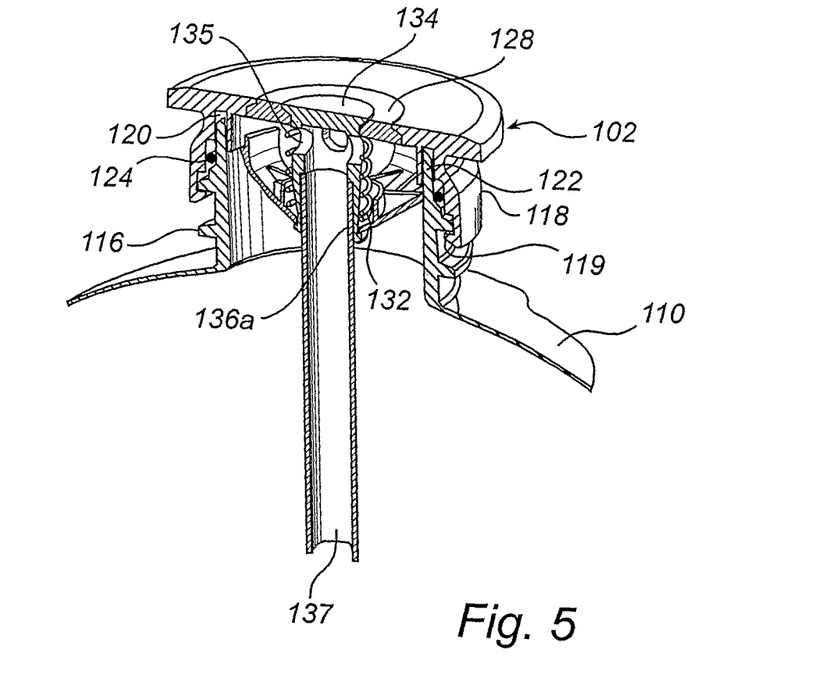
Figure 6:
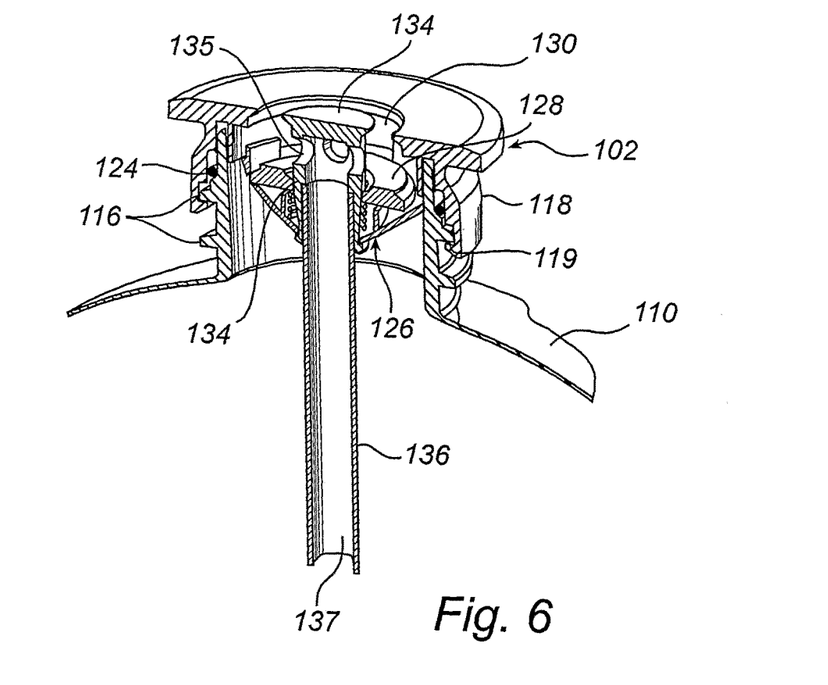

The container 100 further illustrated in FIG. 3 is formed in one piece and generally comprises a neck finish or mouth portion 108, a shoulder portion 110, a body portion 112 and a base portion 114. The mouth portion 108 has circumferential flanges 116 for engagement with the valve element 102 which has a mating circumferential groove/flange arrangement 119 (FIGS. 5-6). The container 100 has a petaloid base portion 114 to make it freestanding. The thickness of the sidewall of the body portion 112 is approximately 0.40 mm.

Figure 4:
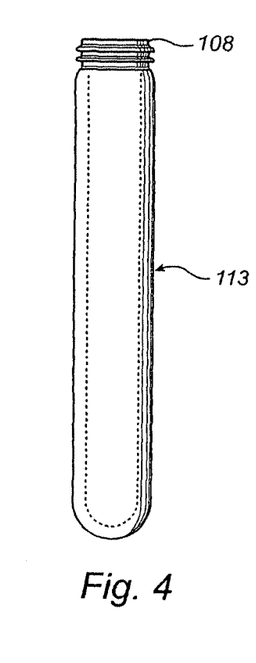
FIG. 4 is a schematic view of a preform (on a larger scale) for the container shown in FIGS. 1-3, FIGS. 5 and 6 are sectional views of a closure element forming part of the system illustrated in FIG. 1, in an open and a closed position, respectively.

The container 100 is blow moulded from an injection moulded parison or preform 113 of plastics. The preform 113 has a wall thickness of approximately 5 mm and the plastic material comprises about 94% polyethylene terephtalate and about 6% polyamide.

The container wall has a barrier against diffusion of oxygen and carbon dioxide. Preferably, cobalt ions are used as scavenger substance blended into the polyamide.

The weight of the preform 113 used is 233 g for a 20 liter container 100, and the weight of the tube/valve assembly 104 is about 40 g. Thus, a complete 20 liter container 100 according to this embodiment ready for filling weighs only about 273 g which is a great advantage compared to heavy duty steel kegs which weigh about 10 kg for the same volume.

Referring to FIGS. 5 and 6, the valve element 102 effectively forms part of the spear structure 104 which is used to dispense beverage from the container 100. The valve element 102 comprises a structural body 118 with an essentially rotationally symmetrical shape. The structural body 118 has an annular groove 120 for receiving a rim 122 of the container mouth portion 108 with a close fit. As the valve element 102 is slipped onto the mouth portion 108, the annular groove 120 will receive the rim 122, as described above, and as the valve element 102 is slipped further the circumferential groove/flange arrangement 119 will engage with the circumferential flange 116 of the mouth portion 108 in a snap-lock engagement which can be seen in FIGS. 5 and 6. An O-ring 124 arranged around the mouth portion 108 is clamped between the mouth portion 108 and the valve element 102 and thus provides a seal.

The valve element 102 further comprises a valve portion 126 concentrically arranged in the valve element 102 acting as a cap. This valve portion 126 generally comprises an annular valve member 128 that is spring biased from below towards the upper part of the valve element 102. The annular valve member 128 is sealingly received in a mating annular concentric gap 130 in the upper part of the valve element 102. A spring 132 biasing the valve member 128 in a closing direction is fastened, see FIG. 5, to a central part of the valve element 102 and is arranged concentrically around a cylindrical member 134 having one end sealed flush with the upper part of the valve element 102 and another end adapted to receive an upper end 136a of the tube 136. Between the two ends of the cylindrical member 134 there is provided radial holes 135 so that beverage being forced up the tube 136 can exit the cylindrical member 134. If the valve member 128 is depressed, see FIG. 6, the beverage, in this preferred embodiment draught beer or cider, will exit the container 100, and if the valve member 128 is biased towards the annular gap 130 the beverage cannot exit.

Figure 2:
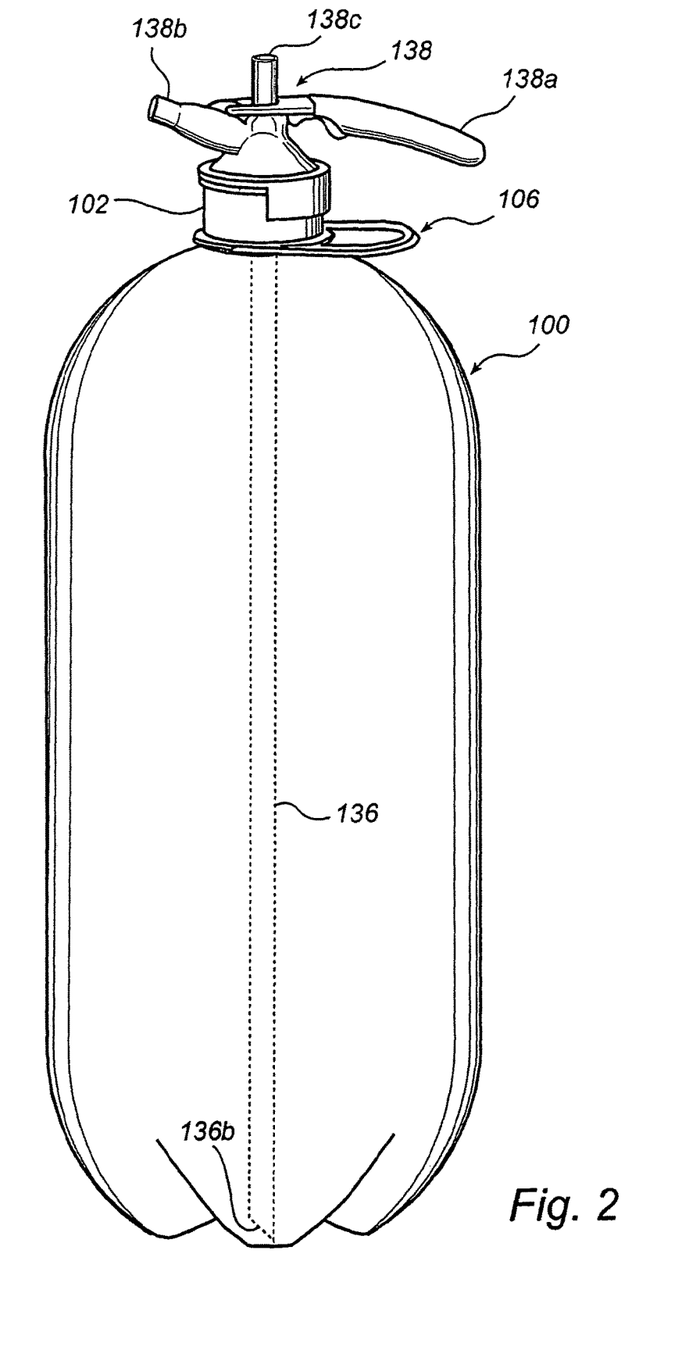

The elongate tube or spear 136 of the spear structure 104 extends from the valve element 102 and into the container 100. The tube 136 has a hollow conduit 137 and the upper end 136a inserted in the valve element 102 as previously described, an inner end 136b being left open for the beverage to enter (FIGS. 1-2).

The spear structure 104 comprising the elongate tube 136 and the valve element 102 is made from polyester, polyolefin, polyamide or similar, apart from the spring 132 which is made of stainless steel. The elongate tube 136 as well as the closure or valve element 102 is generally made from essentially the same group of materials as the container 100, and the tube 136 is quite flexible in the preferred embodiment.

In order to provide an adequate seal of the container 100, at least an outer portion of the annular valve member 128, abutting the edges of the annular concentric gap 130, is made from a material that is softer than the rest of the valve element 102. In order to provide a rigid annular valve member 128, which can be important to the sealing and abutment properties, the interior of the annular valve member 128 can comprise a rigid core (not shown) of a harder material than the outer abutment portion.

Filling of the disposable container 100 with a carbonated beverage (such as beer) is generally conducted in the following manner. Once the spear structure 104 is assembled as a unit 102, 136 it is attached to the container 100 with the tube 136 inserted into the container 100. Then the container 100 is placed upside down in a filling station (not shown). Air inside the container 100 is flushed out by carbon dioxide, and an overpressure (a filling pressure) is established. These measures are taken in order to minimise the risk of foam being produced during filling, which would slow down the filling procedure. If the risk of foam production is low, said measures can obviously be cancelled. During filling the annular valve member 128 is depressed so that beverage can be injected into the container 100. Gas contained in the container 100 is forced out upwards through the elongate tube 136. The container 100 could also be filled prior to the arrangement of the spear structure 104, similar to what will be described in the context of the second embodiment, though this makes less use of the properties of the valve element 102.

Hence, the container producing and beverage filling comprises: blow moulding thin-walled PET containers, attaching the spear/valve structure to the containers and filling these with beverage in the manner described above. The filled containers are stored and then delivered to the customers.

To facilitate transportation the handle 106 can be attached to the mouth portion 108 of the container 100, preferably by sliding it over the mouth portion 108 and fixing it to the container 100 by mounting the valve element 102 to the mouth portion 108 (see FIG. 3). After the filling of the container 100 the valve element 102 is preferably provided with means for dust protection and tamper evidence, such as a foil (not shown).

In use a dispense head 138 is coupled to the valve element 102, and by operating a lever 138a of the dispense head 138 a propellant gas, typically nitrogen or carbon dioxide from an external source (not shown), will be injected into the container 100 through the inlet 138b. Hence, beverage is forced to exit the container 100 through the spear structure 104 and out of the dispense head 138 by an outlet 138c to which a conventional tapping unit (not shown) is connected. The super-atmospheric pressure will thus help maintaining the form and stability of the container 100.

Figure 9:
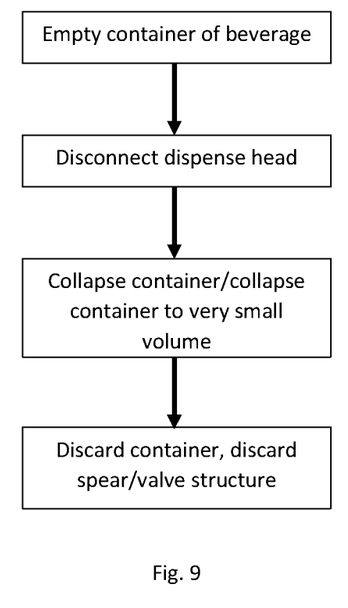
FIG. 9 illustrates a method of using a container.

When the container 100 is emptied of beverage the dispense head 108 is disconnected and the container 100 is collapsed and discarded. The spear/valve structure 104 is also discarded. Hence, a true one-way system is achieved. FIG. 9 illustrates this method.

Figure 7:
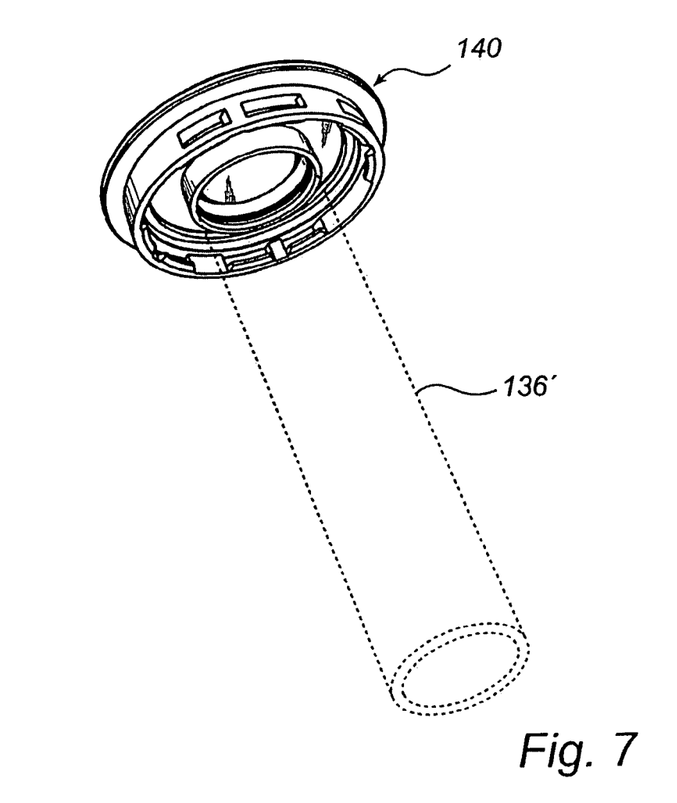
FIG. 7 shows an alternative closure element used in a second embodiment.

FIG. 7 shows an alternative and less complex closure element in the form of a pierceable plastic cap 140. Before being attached to the mouth portion 108 of the container 100 the cap 140 is provided with an elongate tube 136' similar to the elongate tube 136 of the first embodiment. The tube is indicated by phantom lines extending from the cap 140. Prior to being provided with the pierceable cap 140 and the tube 136', the container 100 is filled in the following manner: Air is first flushed from the container 100 which stands upright, by use of carbon dioxide or nitrogen in order to make the filling procedure more efficient. A filling pressure is optionally provided. An elongate filling nozzle (not shown) is inserted into the container 100 which is kept upright, and the beverage is filled into the container 100. The filling rate is slower at the beginning until approximately a decimeter of beverage is filled into the container 100, and the nozzle orifice is submerged. Then, the filling rate increases until the container 100 is filled, after which the pierceable cap 140 and the associated elongate tube 136' are attached to the container 100.

Figure 8:
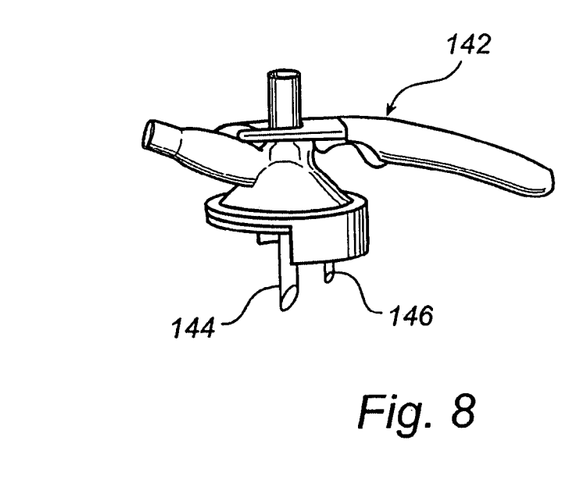
FIG. 8 illustrates an alternative dispense head used for a container provided with the cap of FIG. 7.

In use a dispense head 142, schematically shown in FIG. 8, is connected to the pierceable cap 140 and syringe-like needles 144, 146 having cap piercing capability penetrate the cap 140. A first needle 144 is fluidly connected to the tube 136' for dispensing beverage, and a second needle 146 is fluidly connected in order to provide a propellant gas, generally nitrogen or carbon dioxide, to the inside of the container 100. After use the pierceable cap 140 is discarded.

The dispensing of the filled container 100 and the disposal of the same are basically the same as described earlier. The empty container 100 is discarded, as is the spear/valve structure.

Finally it should be emphasised that the inventive concept is not limited to the embodiments described here, and the skilled person anticipates that modifications are feasible within the scope of the invention as defined in the appended claims. For instance, the freestanding feature of the container can be achieved by a champagne-type base. Furthermore, alternative means for closure of the container mouth portion may be used.

The invention claimed is:

1. A method for distribution and dispensing of draught beer beverages, comprising the steps of:
providing a preform of plastics;
blow moulding said preform into a container configured for draft beer beverage, said container having a capacity of 10-40 liters, a container wall of the container having a barrier against oxygen and carbon dioxide, said container having a mouth portion, a shoulder portion, a base portion and a body portion extending between the shoulder portion and the base portion, said container being freestanding on a plurality of support legs which form part of the base portion, said container being freestanding without the provision of an outer supporting structure on the plurality of supporting legs, said container comprising a one piece construction and being disposable;

filling said container with a draft beer beverage;

providing the container with a tube structure comprising an elongate tube to be inserted in the container and having an inner conduit for beverage, and a closure element to be connected to the mouth portion of the container, wherein—in use—an inner end of the tube is located adjacent to the base portion of the container and beverage is passed from said inner end, through said conduit and to the closure element for dispensing;

closing the filled container by means of the closure element which is connected to the mouth portion, said closure element acting as a closure cap, wherein said filled and capped container forms a unit for distribution; and collapsing the container to a smaller volume after the container is substantially empty, wherein a sidewall thickness of the container body portion is approximately 0.2-0.6 mm.

2. The method of claim 1, further comprising the step of: sealing the mouth portion of the container with a tamper and/or dust seal applied to the closure element.

3. The method of claim 1, further comprising forming the container to withstand a super-atmospheric internal pressure sufficient to dispense the draught beer from the container.

4. The method of claim 1, wherein the sidewall thickness of the container body portion is approximately 0.35-0.40 mm.

5. The method of claim 1, further comprising forming the container base portion as a petaloid base.

6. The method of claim 1, further comprising forming said barrier by a multilayer technique or blend technique.

7. The method of claim 1, further comprising forming said barrier by application of a coating.

8. The method of claim 1, further comprising forming said barrier by a metal ion doping.

9. The method of claim 1, further comprising providing at least a portion of the tube structure with a scavenger or coating.

10. The method of claim 1, wherein the step of providing the preform of plastics comprises providing the preform of plastics to a producer of draught beer.

11. The method of claim 10, wherein the step of blow moulding said preform into a container is performed by the beverage producer.

* * * * *